Dec. 30, 1952 E. B. ROBINSON 2,623,445
METHOD OF PRODUCING HELICALLY WOUND CONTAINERS
Filed Feb. 5, 1947 6 Sheets-Sheet 1

Inventor
Ernest Bradbury Robinson
By
Attorney

Dec. 30, 1952     E. B. ROBINSON     2,623,445
METHOD OF PRODUCING HELICALLY WOUND CONTAINERS
Filed Feb. 5, 1947     6 Sheets-Sheet 2

Dec. 30, 1952     E. B. ROBINSON     2,623,445
METHOD OF PRODUCING HELICALLY WOUND CONTAINERS
Filed Feb. 5, 1947     6 Sheets-Sheet 5

Patented Dec. 30, 1952

2,623,445

UNITED STATES PATENT OFFICE 2,623,445

REISSUED

NOV. 23, 1954

RE. 23,899

METHOD OF PRODUCING HELICALLY WOUND CONTAINERS

Ernest Bradbury Robinson, Treeneuk, Ashgate, England

Application February 5, 1947, Serial No. 726,467
In Great Britain July 24, 1944

Section 1, Public Law 690, August 8, 1946
Patent expires July 24, 1964

7 Claims. (Cl. 93—94)

This invention is for improvements in and relating to a method of producing helically wound containers and more particularly to containers each having a helically wound unitary pattern thereon. The invention has reference more particularly but not exclusively to containers of paper or cardboard or both.

It has been known to form helical tubing from which containers can be cut by first wrapping a length of material helically around a mandrel with the edges of successive laps lying in contact with one another so that a helical butt joint is formed and then superimposing upon the helix so formed a second helix identical with the first, but out of registry therewith and preferably so disposed that the helical butt joint of the second helix is midway between the helical butt joint of the first. The two helices are adhered by adhesive. Additional wrappings can be superimposed similarly. The material of which the first helix is made may be the same as or different from that of which the second or subsequent helices are made. The tubing so formed is made by a continuous process and is severed transversely at intervals by a saw into lengths of say from 12 to 15 inches and from each length a plurality of rims or containers is subsequently formed by cutting the tubing transversely, the length of each container being preferably but not necessarily the same and being accurately determined.

This involves the use of a single cut winder and a subsequent gang cutting operation. It is also known to use a gang cutting winder and thus produce the final container lengths in a single cutting operation.

The present invention provides a method for the production of helically wound tubing having a circumferentially disposed unitary pattern repeated along the length thereof, which comprises winding an inner strip or ribbon helically onto a mandrel to form an inner tubular layer, taking a further strip or ribbon having the said unitary pattern repeated diagonally along it and winding said further strip helically to form an outer tubular layer with the pattern disposed in rings on its exterior. Where I speak of "unitary pattern," I refer to a pattern complete in itself, as contrasted with a pattern such as a "barber-pole" or other pattern having no identifiable beginning or end. The actual decoration appearing in a unitary pattern may cover all or only part of the surface of the container as cut from the tubing. According to a feature of the invention the being-formed tubing is cut into lengths on the winding machine and the time of cutting is regulated by a detector actuated by control features on the said pattern strip or ribbon. By a "control feature," I means an area which is so differentiated from the adjacent area as to serve as means to regulate the time of cutting either by a human operator or by automatic mechanism.

It will of course be appreciated that the invention is not limited to the use of two or more superimposed wrappings. There may, for instance, be a plurality of superimposed wrappings each with a helical butt joint out of step with one another and an outer wrapping with a helical lap joint superimposed thereon, the joint of the outer wrapping being preferably out of step with that of the wrapping to which it is adhered and successive wrappings being preferably adhered to one another. Furthermore, both the inner and outer wrappings (if there are only two wrappings) or the outer wrapping and one or more of the inner wrappings (if there is a plurality of inner wrappings) may be formed with a lap joint if desired.

The aforesaid unitary pattern may consist of printing (e. g. letter-press or an illustration) and if the outer wrapping has a lap joint, it will be so disposed and arranged that none of the patterning matter is hidden by the overlap except a surplus provided along one edge of the strip.

The foregoing and other features of the invention set out in the appended claims are incorporated in the method of manufacture and in the container now to be described with reference to the accompanying drawings in which:

Fig. 6 is an end view in elevation, partly in section, of part of the machine of Fig. 5 when adapted to practise my invention.

Fig. 7 is a view in side elevation of the driving drum and associated parts with the casing removed, part of the view being in the form of sections, taken on the line 7—7 of Fig. 6.

Figs. 12 to 17, inclusive, are diagrams in elevation of alternative means for measuring lengths of the strip prior to winding, or of the tubing, for the purpose of controlling the saw of Figs. 8 and 11; Fig. 12 showing control of the strip by passing it over a drum with which are associated means for controlling the tube-cutting saw; Fig. 13 showing the measuring device associated with the mandrel on which the tubing is wound; Fig. 14 showing an endless chain driven by the strip and actuating the control means; Fig. 15 showing a detail of the control by the chain of Fig. 14 by perforations in the strip; Fig. 16 showing a modification of Fig. 15 in which there are projections on the strip instead of perforations; while Fig. 17 shows a further modification of Fig. 15 in which the perforations in the strip serve to control pneumatic means.

The tubing from which the containers are produced in the example shown in the drawings is formed on a stationary mandrel 1 of cylindrical shape and is produced by the spiral application thereto of two ribbon-like strips of material 2, 3, this material being for example, paper, thin cardboard, fabric or cellulose material such for example as that sold under the trade-mark "cellophane." The strips are drawn onto the mandrel (from sources 5, 6 Figure 5) and the being-formed tubing is rotated on the latter and is screwed along it by means of an endless belt 7 having one lap which makes a complete turn round the being-formed tubing. The travel of this belt rotates the tubing and screws it along the mandrel 1 whilst simultaneously drawing the ribbons 2, 3 from their respective sources of supply 5, 6 and applying them helically to the mandrel. In practice (see Fig. 2) the second ribbon or strip 3 is not applied until after the ribbon or strip 2 has made at least one turn of the inner lap (which is indicated by the reference 2A in Figs. 1 and 2).

Figures 1, 8:
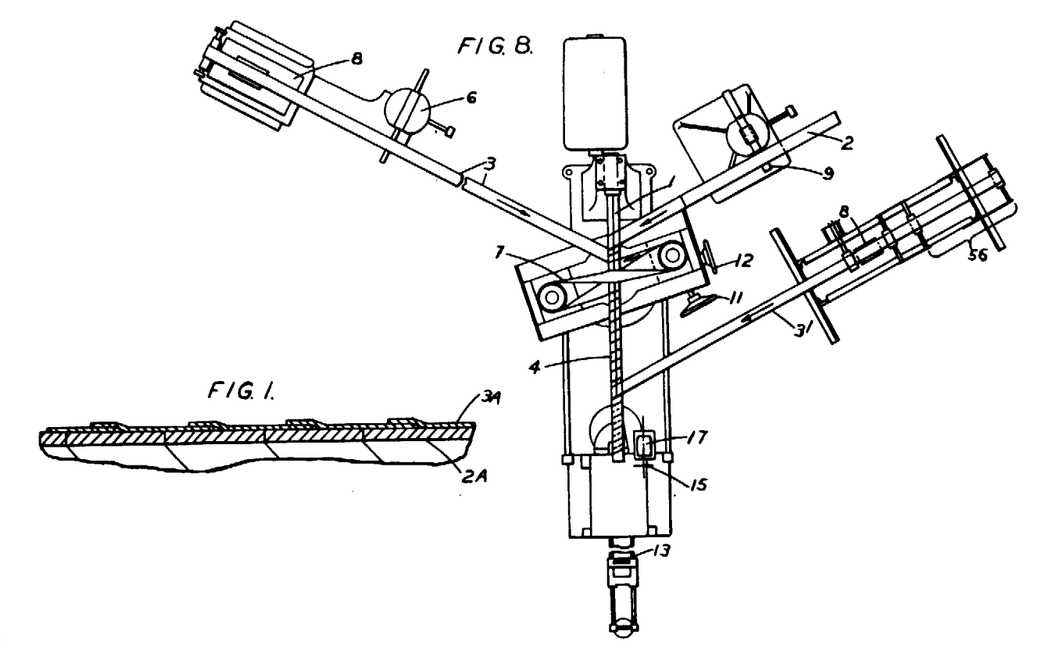
Fig. 1 is a view in longitudinal section through a portion of tubing made in accordance with my invention.
Fig. 8 is a plan view of a machine according to Fig. 5, modified to carry out my invention.
Figure 2:
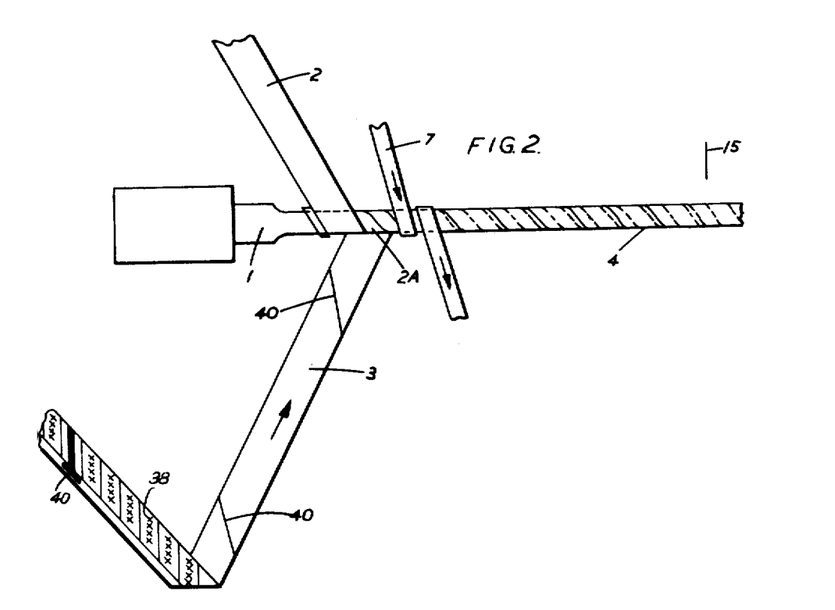
Fig. 2 is a diagram illustrating the helical winding of tubing such as shown in Fig. 1.

This first strip or ribbon 2 is so coiled on the mandrel 1 that the edges of the successive convolutions abut to form a helical butt joint as is clearly shown in Figure 1, but the second ribbon or pattern strip 3 is substantially wider than the strip 2 and, being given the same pitch when wound, has the margins of successive convolutions of the outer lap 3A overlapping to form the helical lap joint shown in Figure 1. Preferably the two helical joints are out of register as shown in Figure 1, for example, to the extent of substantially half a pitch so that the helical butt joints occur substantially midway between two helical lap joints.

The two layers 2A, 3A, and the overlap constituting the lap joints are stuck together during manufacture. For this purpose the ribbon or strip 3 is fed to the mandrel with adhesive or gum applied to it. This adhesive may be applied to the strip in its traverse by passing it over or through a gum-applying device 8 (Fig. 5) or the strip may be withdrawn from a supply thereof with the adhesive ready on it, in which case it will usually be desirable to pass the strip over a moisture-applying device so as to moisten the adhesive.

Figure 5:
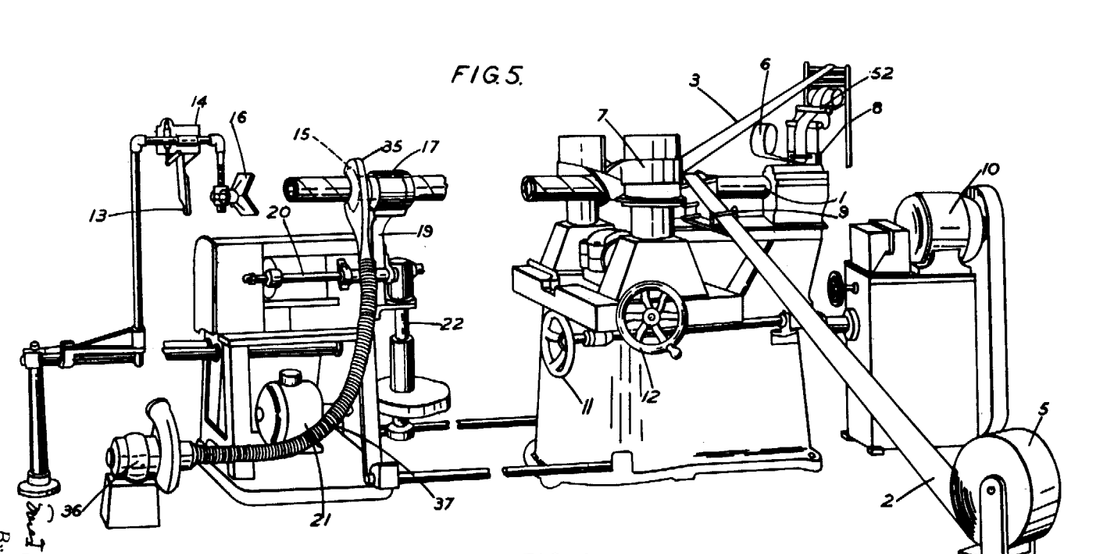
Fig. 5 is a perspective view of a standard single-cut tube winding machine.

Reference to Figure 5 discloses that the strips pass to the mandrel 1 through suitable guiding means 9, and that the machine is driven by an electric motor 10, the angle of the belt 7 being adjustable by hand wheel 11 and its tension by hand wheel 12.

It will be appreciated that the tubing 4 is formed as a continuous process. If desired successive lengths such as a stick or bite may be severed from the end of the tubing as it comes from the mandrel 1. For this purpose the end of the tubing in the prior art has made contact with a target 13 placed to receive it so that contact of the tubing end with the target closes contacts of a switch 14 and brings into operation a saw 15 which cuts off a length or bite of the tubing. 16 indicates a steady for the end of the tubing.

Figures 6, 7, 12:
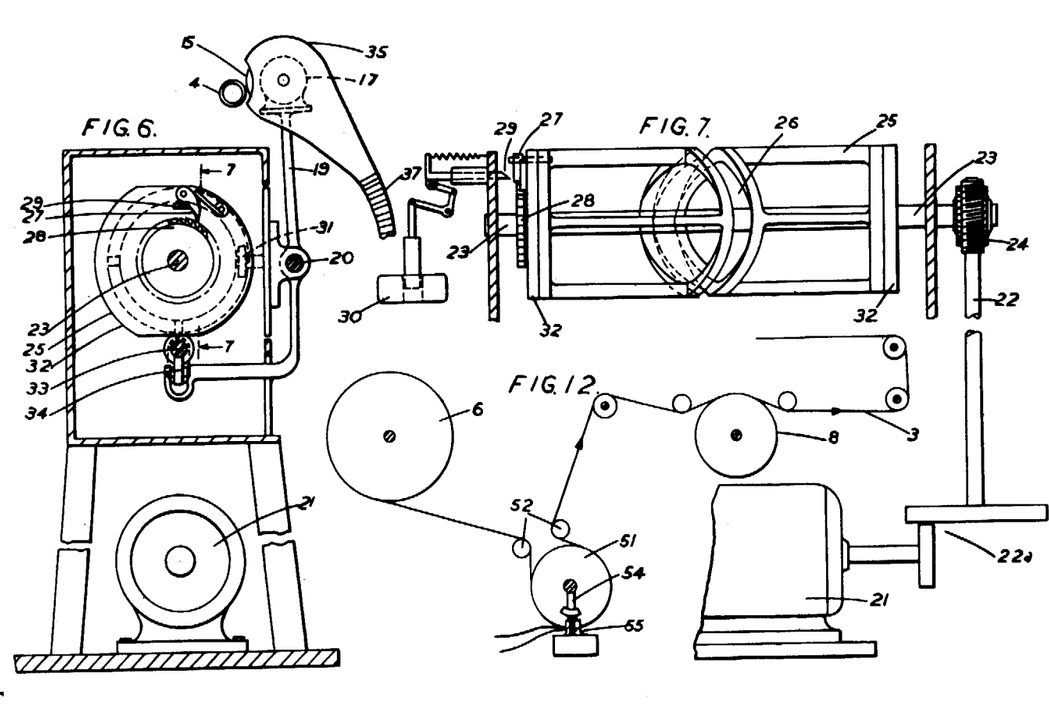

In the sawing mechanism shown in Figs. 5–7, the rotary saw 15, is driven by electric motor 17. It is mounted on a bracket 19 which, when switch 14 is operated by target 13, swings on rod 20 to carry the saw blade through the tubing 4 and also traverses along said rod 20 at the same longitudinal speed as the tubing. For this purpose there is a motor 21 driving a shaft 22 (through friction roller disc 22a) (Figs. 6 and 7) which in turn drives a drum shaft 23 through gearing 24. A drum 25 is freely rotatable on shaft 23, and is formed with an endless oscillating groove or track 26. It may be driven from the shaft 23 by the engagement of a pawl 27 on the drum with a ratchet wheel 28 on the shaft. This engagement is normally prevented by a spring-loaded catch 29, but when switch 14 is operated solenoid 30 is energized to release the catch so that the drum rotates for one revolution. Since the bracket 19 has a follower 31 engaged in track 26, the saw 15 is thereby reciprocated.

In order to move the saw 15 transversely to the tubing at each end of its traverse there is a pair of cam discs 32 one at each end of drum 25 which displace a bar 33 along which a truck 34 on bracket 19 travels. The saw 15 may be partly shrouded in a cowl 35 from which sawdust is extracted by a motor-driven fan 36 and a flexible pipe 37. Thus a cut is made at intervals, each cut taking place after a predetermined length of tubing has been formed. The process thus far outlined is only an example of standard practice for the single saw cut method of operation. The invention is obviously applicable to tubing made with less or more than two strips and where the joints are other than body joints.

In the case of tubing which is to carry repeat i. e., unitary patterns (the expression "pattern" being employed to include a letter press as well as ornamental material or printing) along its length various difficulties occur. If the pattern is applied to the manufactured and already cut tube by wrapping a sheet of pattern-carrying material circumferentially i. e., convolutely around the tube the cost of manufacture is increased. If, as in the present invention, the pattern is continuously repeated along the length of one of the strips it must be ensured that the line of severance always bears the correct space longitudinal relation to one of the patterns. This space relation is affected by numerous variables. As an example of the difficulties it may be mentioned that if lengths (hereinafter termed containers) of 8 inches are to be produced the machine may be conveniently set to sever the continuous tubing as formed every 16½ inches so that from each 16 inch tube thus formed two containers each of 8 inches will subsequently be cut. If now the saw severs the tubing across the middle of the printing of a container the result is that from each bite it will be possible to produce only one container so that there will be 50% waste. If the containers are to be 4 inches long the wastage will be less but even with containers of say an inch or more in length the wastage is still higher than that resulting from my invention. By the present invention the severance of lengths from the being-formed tube is accurately controlled in relation to the printing and wastage is reduced to a minimum. According to my invention no containers are spoiled.

The present invention provides a method for the production of helical tubes from strip or ribbon material by winding said material helically onto a mandrel and severing lengths from the tubing as it comes off the mandrel. The invention is characterised in that unitary patterns are produced along the tubing by unitary patterns applied to the strip before winding, and in that the cut is timed to sever the tubing between successive patterns. In the example shown the cut is timed by means of a detector regulated by reference to a control feature on the strip. The detector conveniently comprises a light-sensitive cell so that the control feature need not necessarily consist of a physical irregularity in the strip (such as for example a notch) but may consist of a surface characteristic such for example as a portion of the pattern itself, or a distinguishing mark separate from the pattern printed on the strip. The cell may operate by the modulation produced by the light falling on it, as by the absence or presence of a control feature in a light beam projecting towards it by a suitable source of light. Thus for example each time a control feature presents itself in the beam it varies the amount of light falling on the light cell and evokes a response from the latter which, operating through a suitable relay system, causes a cutter to cut a length off the end of the tubing. The control feature may contrast with the adjacent surface of the strip in that it is more translucent or more opaque or has different reflecting properties. It will be appreciated that any practicable portion of the spectrum may be employed to actuate the "light-sensitive cell" herein referred to.

The spacing required at the end of each plain, unprinted tube length for purposes of trim when using a single cutter with subsequent cutting operations on another machine is approximately ⅜ of an inch—a total of ¾ of an inch on each tube cut by the single cutter. It will be appreciated that if the depth of any container with printed design approximates to ⅜ inches, then it is immaterial as regards economy of material whether this space is occupied by a standard printed design or by a blank (for example incorporating a circumferential ring whereat the saw cut should occur). If the former alternative is employed then of course a distinctive control feature must be included in the standard printing. If the latter method is employed then the circumferential ring referred to may also be used as the control feature for the light ray apparatus.

It is within the scope of the invention to perform the act of detection either on the tubing or as the strip is travelling to the mandrel.

Figure 3:
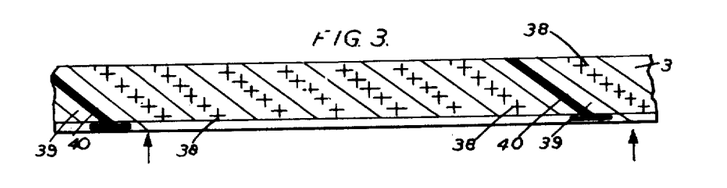
Fig. 3 is a plan view of a portion of one of my novel outer or pattern strips before it is wound onto the tube.
Figure 4:
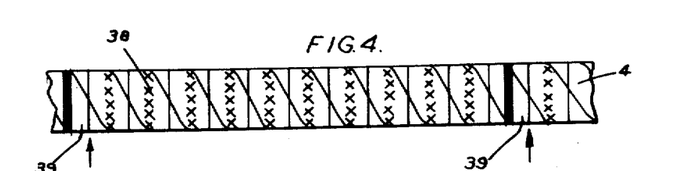
Fig. 4 is a view of a portion of wound tubing made from a novel strip printed for use in forming a longer bite than the strip of Fig. 3.

Turning now more particularly to Figs. 3, 4, 8, 9 and 10, it is required to provide unitary patterns 38 along the length of the tubing and for this purpose in the particular embodiment shown in the drawings the patterns are repeated diagonally along the length of the outer strip 3 as shown in Figure 3, the obliquity being such in relation to the pitch of the helix that in the finished tubing each pattern is disposed circumferentially or at right angles to the axis of the tubing. The circumferential length of each pattern, measured in the diagonal direction of the strip 3, is slightly greater than the circumference of the finished tubing to allow for the lap joint. Because it is desired to leave in the finished tubing blank spaces where the saw cut is to be made, as at 39 (Figure 3), certain blank spaces 39 (Fig. 3) are left along the strip 3.

Figure 9:
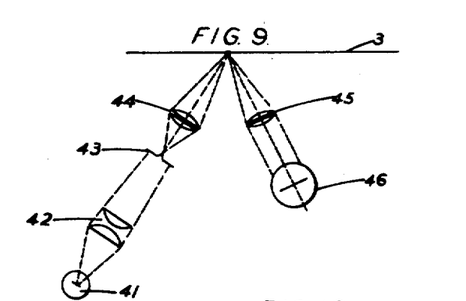
Fig. 9 is a diagram illustrating an arrangement of the light-sensitive cell employed in my machine of Fig. 8.

At predetermined intervals along the length of the outer strip 3 a line 40 is printed to form a control mark and as the strip 3 transverses towards the mandrel these control marks present themselves one after another in a beam of light which is projected onto the strip from a lamp 41 by way of a condenser 42, slit 43, and a lens 44, (Fig. 3). The beam of light is reflected from the surface of the strip by way of a lens 45 onto a light-sensitive cell 46, and the presence or otherwise of a control mark 40 in the beam of light therefore modulates the light beam and determines the amount of light falling on the cell 46 with a resultant variation in the electric response of the latter. The cell thus actuated serves to control the saw blades 15 to sever substantially at the trim space 39 a length of the tube from the tubing emerging from the mandrel. It therefore follows that each cut is placed in substantially constant space relationship with respect to the patterns 38.

The accuracy of winding may be upset by variable factors, such for example, as, inconsistency in the caliper or width of paper shrinkage or stretch of the pattern layer or strip, variation in glue tackiness or fluidity, and alteration in the pitch of the windings. Other factors which may produce variations are mechanical deficiencies such as belt slip, and in certain machine constructions employing non-positive gearing, fluctuation of the ratio between winding and cutting mechanism.

Figure 19:
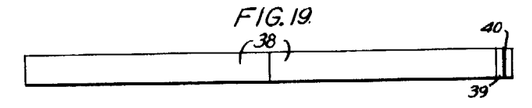
Fig. 19 is a diagram of a bite of tubing to contain two unitary patterns and one narrow trim space.

I have already described how the saw 15 can be made to cut the being-formed tubing 4 at any predetermined position by means of the light ray observing on the strip 3. It will therefore be appreciated that such a position in relation to the printing can be observed by the machine or, if desired, the operator. Such predetermined position can be provided for by printing a line of say ⅛ inch width running circumferentially round the tubing and forming a circumferential ring, the width of such line allowing for the necessary tolerance. In the example the surplus beyond the nominal total container length of 15⅜ inches is ¾ of an inch. Allowing ⅜ of an inch at each end of the bite or stick cut off the being-formed tubing by the single cutter on the winding machine, the line ⅛ of an inch thick is located therein. The balance is trim to ensure that the end containers are actually trimmed when subsequently cut to length on the gang cutter. It will be seen that the cut coming in the ring formed by the line is in predetermined relation to the unitary pattern and leaves adequate amounts of tubing for the final cuts to container length on the gang cutter. The length of pattern strip for a bite containing two unitary patterns and narrow surplus trim space is indicated in the diagram constituting Fig. 19 of the drawings. It will be noted that this surplus space material is less in wound length in Fig. 19 than a wound unitary pattern.

The errors are cumulative and my method is to correct for them before they accumulate to the point where they become commercially objectionable. To do this I prefer to introduce planned trim at least at one end of each bite or cut length. I have noted that it is the difference between the nominal and actual lengths which determines the problem and which must be compensated for to keep the accumulation of error of pattern registry relative to the container length confined within the length of tubing cut at one cutting operation. The surplus trim spaces occur between a given number of patterns, i. e., one or more patterns of the pattern-bearing strip and compensate for differences between the actual and nominal wound pattern lengths due to the variables mentioned. The compensation therefore is to keep the unitary pattern in longitudinal registry with the ends of its container. My surplus trim space ensures that no container will be of less than predetermined length. I correct errors in pattern position by periodically cutting off the accumulated errors before they become objectionable in amount. In this way the patterns are all substantially undamaged.

Figure 10:
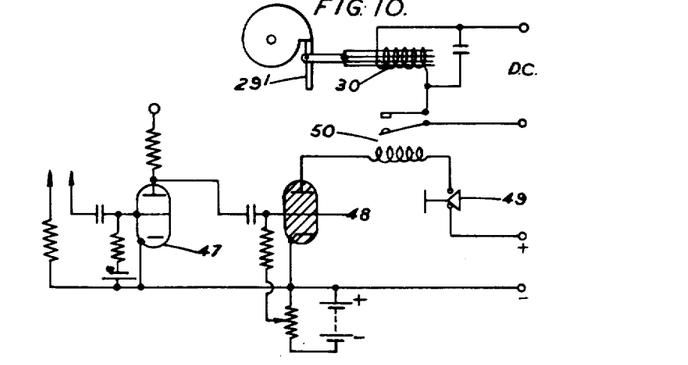
Fig. 10 is an electrical wiring diagram for the machine of Fig. 8.
Figure 11:
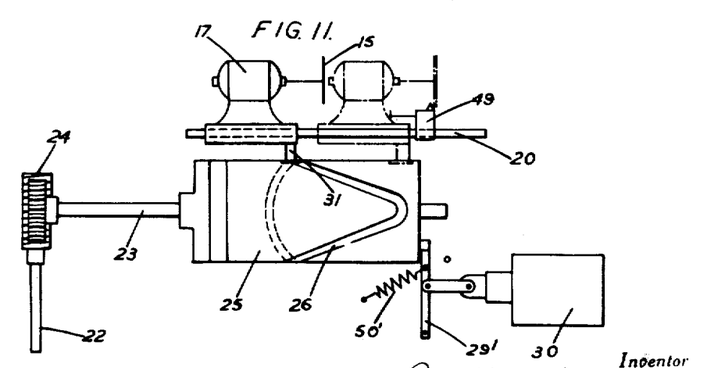
Fig. 11 is a view in elevation of a form of mechanism for actuating the tube-cutting saw under the control of the light-sensitive cell of Figs. 8–10.

The light-sensitive cell 46 is connected to an amplifying circuit (Fig. 10) containing a valve 47 to amplify the impulses. The latter are applied to the grid of a gas-filled relay 48 so that current flows between the anode and cathode of the relay each time a control mark 49 is presented on the beam. Thus current flowing in the circuit containing the reset switch or limit switch 49 operates a further relay 50 to energise the solenoid 30 which performs the mechanical functions of releasing catch 29 (Fig. 6) or the equivalent catch 29' (Fig. 10). Therefore, the immediate response of the light-sensitive cell is that the motor 17 and saw blade 15 are made to traverse lengthwise of the being-formed tubing at the same linear speed of the tubing 4. During this traverse the saw blade is moved laterally against the tubing to produce a cut, after which the saw is moved laterally in the reverse direction and the saw and motor are returned by the cam drum 25. This lateral movement may be produced by any convenient means such as already described with reference to Figs. 6 and 7, and the motor swings about the guide 20. At the extremity of its travel the motor operates re-set switch 49 to break the circuit through the gas-filled relay 48 so that the catch 29' is re-set under the influence of spring 50' (see Fig. 11).

Figure 8 shows that the foregoing scanning apparatus having the general reference 56 may be applied to a third strip 3'. This third strip 3' may be applied by adhesive by passing the strip through or over a gum-applying device 8 as before described with reference to the strip 3.

The apparatus may be associated with the gum-applying device 8 or it may be mounted on a trolley as a portable unit. In the latter case the gum-applying device 8 may be movable into such a position that the unit may be interposed between it and the machine proper.

The linear production of tubing, for a given linear consumption of a strip, may be varied by varying the spirality of the tube windings (thereby varying the overlap or butt joint between successive convolutions). This result may be achieved by adjusting the belt angle. Such an adjustment is effected manually by the operator by means of wheel 11.

Other methods of controlling the cut are illustrated in Figs. 12-17.

According to the method shown in Figure 12, the strip or ribbon 3 in its passage to the mandrel passes over and in contact with a rotatable cylinder 51, with which are associated means for causing the knife or other element functioning to cut the helically wound tube. The circumference of the cylinder 51 is preferably the same as the length of the strip or ribbon in each length of tubing to be cut and the arrangement is such that the cylinder functions to actuate the cutter 15 once in each revolution. The strip or ribbon 3 passes over and in contact with part of the periphery of the cylinder and means are provided for ensuring that there is no slip between the strip and the cylinder. The strip may, for example, pass round pulleys 52 which may if desired be jockey pulleys or spring-influenced pulleys, which maintain the strip in close contact with the cylinder 51. A member such as an arm or projection 54 is associated with the cylinder in such manner that once in each revolution said member actuates the cutting device (e. g. by operating a switch 55 which is the equivalent of switch 14 or cell 46) to sever the wound tubing. The circumference of the aforesaid measuring cylinder 51 should be the same as the circumference of the printing cylinder from which the unitary patterns on the strip are printed. The foregoing mechanism may be combined with the gumming unit 8.

It may be noted that if the invention is carried into effect by the use of a measuring drum, a projection on the drum may engage, in turn, spaced perforations in the strip to ensure perfect registry. A distinguishing mark such as a coloured band may be formed on the strip such as by printing at spaced locations and a distinguishing mark may be formed on the measuring drum. When starting up the machine the distinguishing mark on the strip is brought into registry with the distinguishing mark on the drum so as to ensure that the wound tubing is severed at the correct locations.

To allow for variations in thickness, texture and other properties of the strip, and also to allow for shrinkage or stretch in the strip and any inaccuracies in the printing, adjustment means are preferably provided. The effective circumference of the drum may, for example, be adjustable. Alternatively the drum over which the strip passes, that is to say, the measuring drum, may drive a second drum or member such as through variable gearing. This second drum or member functions to control the actuation of the cutter or other severing device. If, therefore, due to irregularities or variable factors, the tubing is not being severed at the correct location, requisite adjustment can be made by varying the speed of rotation of the second drum until the cut is in fact made at the required location. For example in Figure 12 the arm 54 may be adjustable circumferentially. The arrangement is preferably such that the tubing is severed across the said distinguishing mark and the operator can readily, therefore, see if the tubing is not being severed at the correct location, and can readily make appropriate adjustments.

Figure 13:
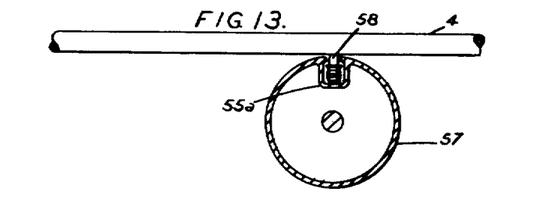

In an alternative method shown in Fig. 13 the measuring device is associated with the mandrel, on which the tubing is wound. Located in close proximity to the mandrel is a drum, wheel or the like 57 which is in contact with the helically wound tubing 4 as it passes down the mandrel and is rotated by such tubing. Associated with this drum or pulley is a member (here shown as a switch 55a operable by a plunger 58) functioning to control the knife or severing device which cuts the wound tubing. The arrangement and disposition of the parts are such that said drum or pulley actuates the severing device after a predetermined length of strip has been wound onto the mandrel.

Figure 14:
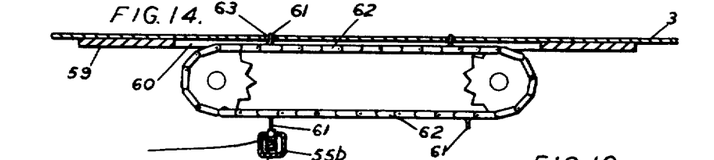

In a still further alternative shown in Figure 14 the strip or ribbon 3 in its passage to the mandrel travels over a flat bed 59 having a slot 60 therein through which projects one or more projections 61 conveniently carried by an endless chain or equivalent element 62. The said projections 61 engage in perforations 63 in the strip 3 so that the chain 62 is driven by the strip and the arrangement is such that successive projections on the chain engage in successive spaced perforations formed in the strip. The said chain 62 is therefore driven through the intermediary of the said perforations 63 in the strip 3 which are spaced at a predetermined distance apart, and associated with the said chain are means (here shown as a switch 55b operable by projections 61) for controlling the knife or other severing member at predetermined intervals, with the result that the length of the cut tube is definitely controlled.

Figures 15, 16, 17:
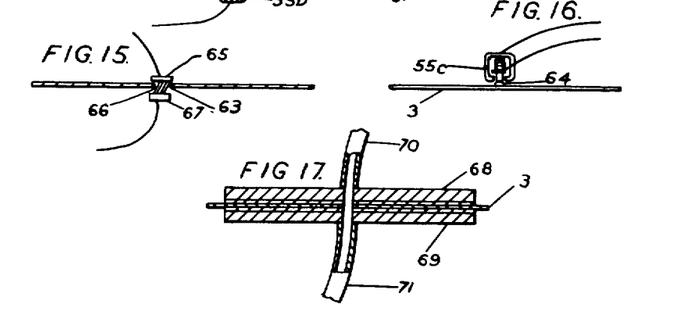

As shown in Figure 16 the switch 55c may be operable by suitable spaced projections 64 on the strip 3. In Figure 15 the strip 3 is provided with suitably spaced perforations or cut-outs 63 and is traversed between a contact 65 having a conducting brush 66 and a contact 67 so that when a perforation reaches the inspection station, the two contacts engage or permit of an electrostatic discharge. In Figure 17 the perforated strip 3 traverses between valve plates 68, 69 and serves to interrupt or establish communication between pneumatic suction or pressure tubes 70, 71.

Figure 18:
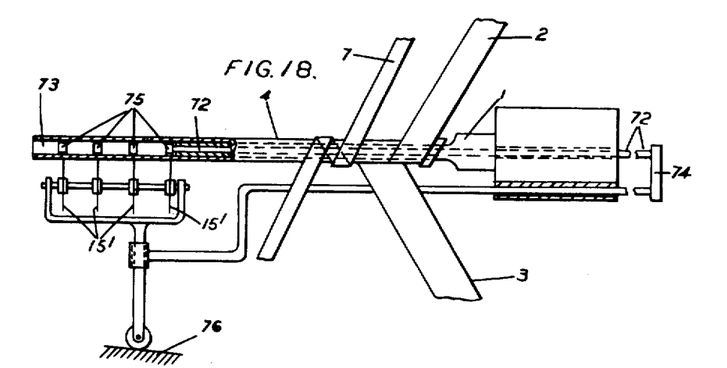
Fig. 18 is a view in elevation of part of a gang cutting winder showing a modification of the saw mechanisms of Figs. 6, 7 and 11 in which there are a plurality of cutters.

The use of my invention in a gang cutting winder is illustrated in Fig. 18, according to which the winding machine is provided with a plurality of cutters associated with the mandrel in combination with means for automatically controlling the operation of such cutters to ensure that the bite is cut directly into a plurality of smaller tubes in substantial registry with printed or other matter appearing on the exterior. Any of the automatic means hereinbefore disclosed, in such drawings as Figs. 9, 10 and 12–17, may be employed for achieving this desideratum. There is conveniently provided a fixed mandrel 1 extending forwardly from that end of the machine whereat the strips 2, 3 are wound and this mandrel is of any suitable desired length and is of hollow configuration. Located within the hollow mandrel 1 is a sliding rod 72 to the forward end of which is fixed a second mandrel 73 which is in line with and forms a continuation of the fixed mandrel and is preferably of slightly smaller diameter. Associated with the sliding mandrel 73 is a series of spaced saws or cutters 15'. The saws or cutters 15' may all be spaced the same distance apart or otherwise as desired. Means 14 are provided for traversing the sliding mandrel 73 and the cutters 15' forward away from the fixed mandrel 1 at the same rate that the spirally wound tubing moves axially along the mandrel in the process of being formed so that the saws 15' are maintained in register with grooves 75 in mandrel 73, and a return motion is provided for effecting movement of the sliding mandrel and cutters in the opposite direction. Assuming that the sliding mandrel 73 and cutters 15' are in their most rearward position the said mandrel and cutters move forward in unison with the tube when the control feature indicates that the requisite tubing has presented itself, and the cutters are moved by means 76 into a cutting position to cut the tubing on the sliding mandrel into a series of smaller tubes. By virtue of the fact that the tubing and the cutters move forward in unison the cutters cut the tubing along a line normal to the axis of the tubing. As soon as the cutting operation has been effected the sliding mandrel and cutters return by return motion to their rearmost positions and the sliding mandrel will enter that length of tubing extending forwardly from the fixed mandrel, being the length of tubing which has been formed during the aforesaid cutting operation. This cycle of movement is repeated throughout.

In carrying the invention into effect the action of the cutters 15' in cutting the tubing 4 is controlled by any of the means already described to ensure that the tubing is cut in registry with printed or other matter appearing on the outside of the tubing.

It will be seen that with my invention it is possible to make containers of predetermined length with unitary patterns spirally wound on the outside, and have those unitary patterns in substantial longitudinal register with the ends of the containers. I have achieved this by cutting the containers to length as heretofore, but periodically abating, i. e., either reducing or confining, the winding errors of the pattern by cutting my containers in predetermined relation to the unitary patterns so preventing the errors from accumulating beyond commercial tolerance. I provide surplus trim space on the pattern strip together with control features, and I regulate the time of severance by reference to the control features and thereby in predetermined relation with the patterns. It will be obvious that the features on the pattern strip define only the theoretical length of the pattern until the strip is actually wound on the tubing. However, due to winding errors previously described, the actual spacing of the control features, and of course the patterns as appearing on the tubing, will be correspondingly varied from the theoretical spacing as appearing on the strip. Therefore it will be obvious that marks on the patterns as wound can be used as a means for ensuring that the errors of winding are noted. I find that a suitable period or interval at which to periodically eliminate the accumulated errors of winding is the length of a stick or bite such as normally is cut off a spiral winding machine in one operation, whether it be a single winder or a gang cutting winder. The accumulation of error in a bite is within the commercial tolerances permitted, so that variations between nominal and actual length of the wound patterns can be compensated for by trim space in a bite and still produce containers of predetermined length with substantially undamaged and commercially acceptable patterns in registry. It might be noted that this method applies not only to the gang cutting type of winder where the bite or stick is cut off and simultaneously reduced to final container lengths, but also to the method used where a single cut winder and a separate gang cutting operation are employed. In the case of the single cut winder the cut is in predetermined relation with the pattern, i. e., in registry therewith, even though this preliminary or rough cut falls in the trim space, regardless of whether or not there is an accumulated variation in pattern lengths. The reason for this is the manufacturing necessity of trimming each end of each container to length at the final cutting in order to be sure that the end containers are not shorter than standard, i. e., predetermined length.

One of the great advantages of the invention is the saving in waste. In actual practice it is found that the accumulated winding errors frequently will throw unitary patterns out of register in a matter of seconds of time when the cutters are operated on the basis of the length of tubing from the last end cut. Therefore, without my invention it has been impossible to use gang cutting spiral winders to produce commercially good containers with spirally wound unitary patterns. Without my invention such a machine would have 100% waste as soon as it got out of register. In the case of single cut winders, where the final cutting to length is done in a separate gang cutting operation, without my invention the end containers in each stick would be wasted whenever unitary patterns got out of register with the rough cut. The hand-operated separate gang cutting operation would be able to save the intervening containers as distinguished from the gang cutting winder method, but—without my invention—only at the expense of the end containers. Even this loss of end containers made the method commercially prohibitive in most cases. By the use of my method the end containers can be saved in every case at the expense of a loss of trim space which can be shorter than the shortest container used. Thus a trim space of say ⅛ of an inch for a single cut winder method, or 1/16 of an inch for a gang cutting winder method, is a sacrifice in length, compared to the length of a stick or bite, which is very slight and is commercially acceptable. It will be seen that my invention now makes it commercially worth while to produce spirally wound unitary pattern containers.

Reference is hereby made to my copending application Ser. No. 11,955, filed February 28, 1948 (now Patent No. 2,623,443), wherein machines capable of carrying out the method of the present application are disclosed and claimed.

Reference is also made to my copending application Ser. No. 322,370, filed November 25, 1952, entitled "Method of Making Helically Wound Containers," wherein a form of the general method claimed herein is disclosed and claimed.

I claim:

1. A method of producing cylindrical containers of predetermined length each having a helically wound unitary pattern thereon, comprising providing strip material bearing unitary patterns each approximately equal in wound length to a predetermined container length, control features and surplus space material greater in wound length in each bite to be cut off the tubing than any winding errors expected to occur in the bite, helically winding the strip material and simultaneously moving the tubing axially, detecting a control feature and regulating the severing by reference to the control feature and severing a bite of tubing in predetermined relation with the wound patterns, the bite including at least one unitary pattern and surplus space material, and cutting up the bite to form at least one container of predetermined length with each unitary pattern in substantial registry with its container; whereby errors of length of the wound pattern are abated in each bite.

2. A method of producing cylindrical containers of predetermined length each having a helically wound unitary pattern thereon, comprising providing strip material bearing unitary patterns each approximately equal in wound length to a predetermined container length, control features and surplus space material greater in wound length in each bite to be cut off the tubing than any winding errors expected to occur in the bite, but less in wound length than a wound unitary pattern, helically winding the strip material and simultaneously moving the tubing axially, detecting a control feature and regulating the severing by reference to the control feature and severing a bite of tubing in predetermined relation with the wound patterns, the bite including a plurality of unitary patterns and surplus space material, and cutting up the bite to form containers of predetermined length with the unitary pattern in each container in substantial registry with the ends of its container; whereby the errors of length of the wound pattern strip are abated in each bite.

3. A method of producing cylindrical containers of predetermined length each having a helically wound unitary pattern thereon, comprising providing strip material bearing unitary patterns each approximately equal in wound length to a predetermined container length, control features, and surplus trim spaces each greater in wound length than any winding errors expected to occur in a bite to be cut off the tubing, but less in wound length than a wound unitary pattern, the control features being located in the trim spaces, helically winding the strip material and simultaneously moving the tubing axially, detecting a control feature and regulating the severing by reference to the control feature and severing a bite of tubing which includes a plurality of unitary patterns and a trim space at least at one end of the bite, substantially at said trim space and in predetermined relation with the wound patterns, and cutting up the bite to form containers of predetermined length with the unitary pattern in each container in substantial registry with the ends of its container; whereby the errors of length of the wound pattern strip are abated in each bite.

4. A method of producing cylindrical containers of predetermined length each having a helically wound unitary pattern thereon, comprising providing strip material bearing unitary patterns each approximately equal in wound length to a predetermined container length, control features, and surplus trim spaces each greater in wound length than any winding errors expected to occur in a bite to be cut off the tubing, but less in wound length than a wound unitary pattern, helically winding the strip material and simultaneously moving the tubing axially, detecting a control feature and regulating the severing by reference to the control feature and severing a bite of tubing including at least one unitary pattern and a trim space at least at one end of the bite, substantially at said trim space and in predetermined relation with the wound patterns, and thereafter cutting the bite into at least one container of predetermined length in predetermined relation to the pattern, whereby the unitary pattern in each container is in substantial registry with the ends of its container, any surplus trim is cut off, and accumulated errors in length of wound pattern are abated in each bite.

5. A method of producing cylindrical containers of predetermined length each having a helically wound unitary pattern thereon, comprising providing strip material bearing unitary patterns each approximately equal in wound length to a predetermined container length, control features, and surplus trim spaces each greater in wound length than any winding errors expected to occur in a bite to be cut off the tubing, but less in wound length than a wound unitary pattern, the control features being located in the trim spaces, helically winding the strip material and simultaneously moving the tubing axially, detecting a control feature and automatically regulating the severing by reference to the control feature and severing a bite of tubing which includes a plurality of unitary patterns and a trim space at least at one end of the bite at a trim spacing and in predetermined relation with the wound pattern, said bite including a plurality of patterns, and thereafter cutting the bite into containers of predetermined length in predetermined relation to the patterns, including cutting each container at each end, whereby the unitary pattern in each container is in substantial registry with the ends of its container, any surplus trim is cut off, and accumulated errors in length of wound pattern are confined in each bite.

6. A method of producing cylindrical containers of predetermined length each having a helically wound unitary pattern thereon, comprising providing strip material bearing unitary patterns each approximately equal in wound length to a predetermined container length, control features, and surplus trim spaces each greater in wound length than any winding errors expected to occur in a bite to be cut off the tubing, and each such trim space being less in wound length than a unitary pattern, helically winding the strip material, and simultaneously moving the tubing axially, detecting a control feature, and regulating thereby the severing of a bite of tubing including a plurality of unitary patterns, and a trim space at least at one end of the bite substantially at the trim space and in predetermined relation with the wound pattern, and simultaneously cutting the bite into predetermined container lengths measured from the first-mentioned severance, whereby the unitary pattern in each container is in substantial registry with the end of its container, any surplus trim is cut off, and accumulated errors in length of wound pattern are abated in each bite.

7. A method of producing cylindrical containers of predetermined length each having a helically wound unitary pattern thereon, comprising providing strip material bearing unitary patterns each approximately equal in wound length to a predetermined container length, control features, and surplus trim spaces each greater in wound length than any winding errors expected to occur in a bite to be cut off the tubing, and each such trim space being less in wound length than a unitary pattern, helically winding the strip material, and simultaneously moving the tubing axially, detecting a control feature, and automatically regulating thereby the severing of a bite of tubing including a plurality of unitary patterns, and a trim space at least at one end of the bite substantially at the trim space and in predetermined relation with the wound pattern, and simultaneously cutting the bite into predetermined container lengths measured from the first-mentioned severance, whereby the unitary pattern in each container is in substantial registry with the ends of its container, any surplus trim is cut off, and accumulated errors in length of wound pattern are abated in each bite.

ERNEST BRADBURY ROBINSON.

REFERENCES CITED

The following references are of record in the file of this patent:

UNITED STATES PATENTS

| Number | Name | Date |
|---|---|---|
| 710,507 | Osborn | Oct. 7, 1902 |
| 1,491,140 | Holt | Apr. 22, 1924 |
| 1,549,429 | Bartlett | Aug. 11, 1925 |
| 1,929,267 | Weber | Oct. 3, 1933 |
| 2,033,717 | Kopetz | Mar. 10, 1936 |
| 2,084,673 | Dieffenbach | June 22, 1937 |
| 2,199,708 | Maxfield | May 7, 1940 |
| 2,249,820 | Gulliksen | July 22, 1941 |
| 2,354,556 | Stahl | July 25, 1944 |

Certificate of Correction

Patent No. 2,623,445                                             December 30, 1952

ERNEST BRADBURY ROBINSON

It is hereby certified that error appears in the above numbered patent requiring correction as follows:

In the grant, line 3, and in the heading to the printed specification, lines 4 and 5, address of inventor, for "Treeneuk, Ashgate, England" read *Treeneuk, Ashgate, Chesterfield, Derbyshire, England*; column 1, line 18, after "first" and before the period, insert *helix*; column 2, line 4, for "means" read *mean*; column 4, line 67, after "include" strike out "a"; column 5, line 68, for "⅜ inches" read *⅝ inches*; column 6, line 23, for "(Figure 3)" read *(Figure 4)*; line 27, for "transverses" read *traverses*; line 32, for "(Fig. 3)" read *(Fig. 9)*;

and that the said Letters Patent should be read as corrected above, so that the same may conform to the record of the case in the Patent Office.

Signed and sealed this 19th day of May, A. D. 1953.

[SEAL]

THOMAS F. MURPHY,
*Assistant Commissioner of Patents.*

Certificate of Correction

Patent No. 2,623,445                                               December 30, 1952

ERNEST BRADBURY ROBINSON

It is hereby certified that error appears in the above numbered patent requiring correction as follows:

In the grant, line 3, and in the heading to the printed specification, lines 4 and 5, address of inventor, for "Treeneuk, Ashgate, England" read *Treeneuk, Ashgate, Chesterfield, Derbyshire, England*; column 1, line 18, after "first" and before the period, insert *helix*; column 2, line 4, for "means" read *mean*; column 4, line 67, after "include" strike out "a"; column 5, line 68, for "⅜ inches" read *¾ inches*; column 6, line 23, for "(Figure 3)" read *(Figure 4)*; line 27, for "transverses" read *traverses*; line 32, for "(Fig. 3)" read *(Fig. 9)*;

and that the said Letters Patent should be read as corrected above, so that the same may conform to the record of the case in the Patent Office.

Signed and sealed this 19th day of May, A. D. 1953.

[SEAL]

THOMAS F. MURPHY,
*Assistant Commissioner of Patents.*